US006892689B2

United States Patent
Bischofberger et al.

(10) Patent No.: US 6,892,689 B2
(45) Date of Patent: May 17, 2005

(54) COOLING DUCT PISTON FOR A DIRECT-INJECTION DIESEL ENGINE

(75) Inventors: Ulrich Bischofberger, Esslingen (DE); Joachim Schulz, Stuttgart (DE)

(73) Assignee: Mahle GmbH, Stuttgart (DE)

( * ) Notice: Subject to any disclaimer, the term of this patent is extended or adjusted under 35 U.S.C. 154(b) by 35 days.

(21) Appl. No.: 10/451,234

(22) PCT Filed: Jun. 16, 2001

(86) PCT No.: PCT/DE01/02261
§ 371 (c)(1),
(2), (4) Date: Oct. 8, 2003

(87) PCT Pub. No.: WO02/50414
PCT Pub. Date: Jun. 27, 2002

(65) Prior Publication Data
US 2004/0045515 A1 Mar. 11, 2004

(30) Foreign Application Priority Data
Dec. 20, 2000 (DE) ......................... 100 63 568

(51) Int. Cl.⁷ ................................. F02F 3/20
(52) U.S. Cl. .................................. 123/193.6
(58) Field of Search ............... 123/276–279, 123/193.6

(56) References Cited
U.S. PATENT DOCUMENTS

| 2,159,989 A | 5/1939 | Hazen et al. | |
| 3,730,163 A | * 5/1973 | Elsbett et al. | 123/193.6 |
| 4,018,194 A | * 4/1977 | Mitchell et al. | 123/276 |
| 4,270,494 A | 6/1981 | Garter et al. | |
| 4,494,501 A | * 1/1985 | Ludovico | 123/193.4 |
| 5,146,883 A | * 9/1992 | Reipert et al. | 123/193.6 |
| 5,645,028 A | 7/1997 | Matsuoka et al. | |
| 6,032,619 A | 3/2000 | Zhu et al. | |

FOREIGN PATENT DOCUMENTS

| DE | 498 699 | 5/1930 |
| DE | 1 814 123 | 12/1972 |
| DE | 30 32 671 | 3/1982 |
| DE | 44 15 073 | 11/1995 |
| EP | 0 330 005 | 2/1989 |
| EP | 0 787 898 | 1/1997 |
| GB | 2 196 094 | 4/1988 |
| JP | 63147960 | 6/1988 |
| JP | 02049958 | 2/1990 |
| JP | 00087799 | 3/2000 |

* cited by examiner

Primary Examiner—Marguerite McMahon
(74) Attorney, Agent, or Firm—Collard & Roe, P.C.

(57) ABSTRACT

In a cooling channel piston for a diesel engine with direct injection, a reduction in the compression height is achieved while keeping the output the same or increasing it. The piston consists of at least two parts soldered to one another, one of which is a piston base body forged from steel, having a shaft, hubs, and a ring part, and second part of which, consisting of steel or a nickel-based material, comprises a combustion trough and at least a part of the piston head. The piston base body and the second part together from a cooling channel that can be filled with oil.

6 Claims, 1 Drawing Sheet

COOLING DUCT PISTON FOR A DIRECT-INJECTION DIESEL ENGINE

Figure 1:
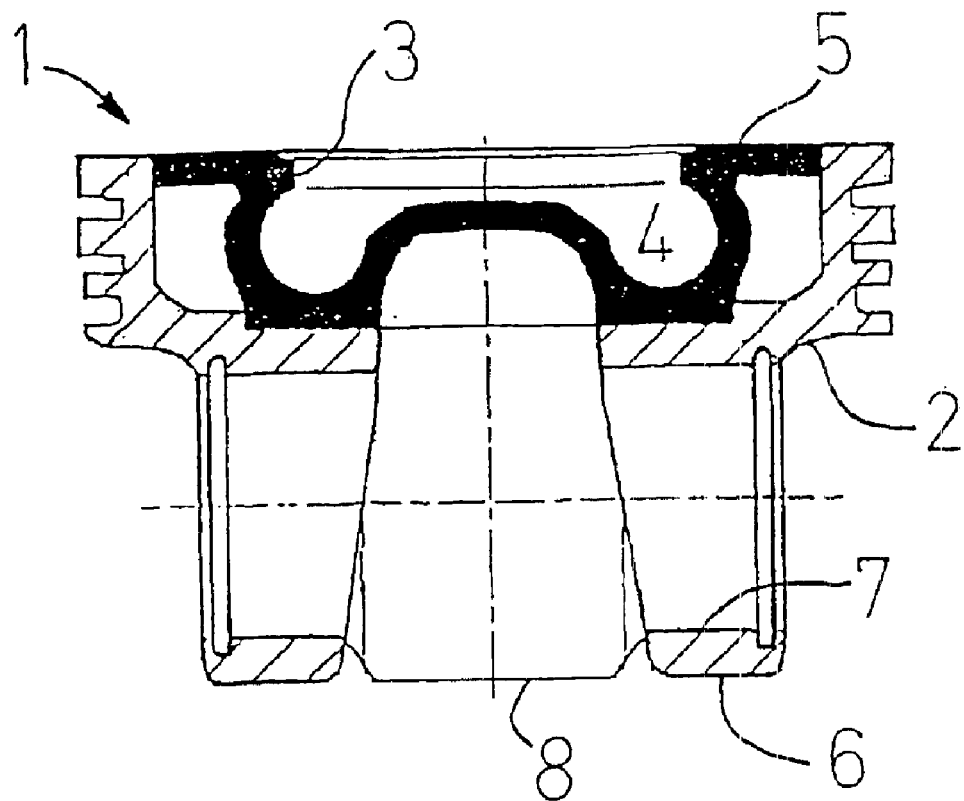

The invention relates to a cooling channel piston for a diesel engine with direct injection.

Up to the present time, such pistons have mostly been structured as cast aluminum pistons or as so-called pendulum shaft pistons, and have been used as standard items by many motor vehicle manufacturers.

The invention deals with the problem of finding a piston concept that allows a reduction in the compression height of the piston, while keeping the engine output the same, or increasing it.

This problem is solved, in the case of a piston of the type according to the preamble, by means of a structure having the features indicated in claim 1. Advantageous further developments are the object of the dependent claims. The compression height of pistons according to the invention lies in the range of 0.35 to 0.6× piston diameter, and preferably at approximately 0.4 to 0.45× piston diameter (D).

The second part, which contains the combustion trough, can be structured as a machined forged part.

Figure 2:
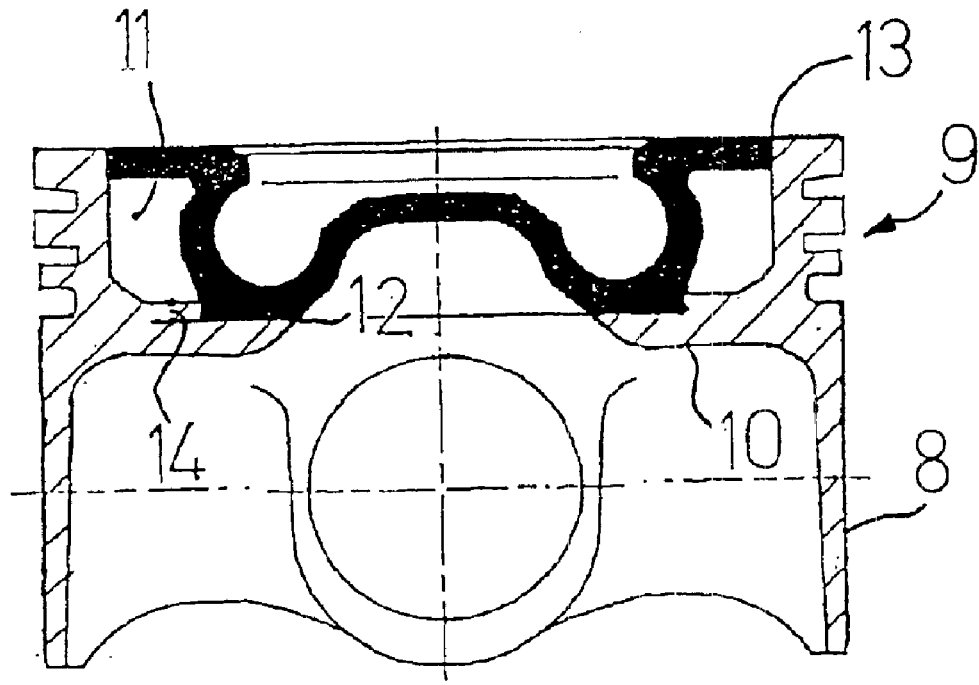

The invention will be explained in greater detail below, using an exemplary embodiment. The drawing shows:

FIG. 1 a piston according to the invention in cross-section, cut in the pin direction, FIG. 2 a piston according to the invention in cross-section, cut in the pressure/counter-pressure direction.

The piston 1 consists of a base body 2 and a component 3 that is soldered to the former, which component comprises a combustion trough 4 and a part of the piston head 5. The base body comprises the hubs 6 with the hub bores 7, the shaft 8, the ring part 9, and the ridges 10, which form part of the inside shape of the piston on the pressure side and the counter-pressure side. The ridges 10 run at the same or approximately the same axial height, radially towards the inside, and form a contact surface for the component 3 in the pressure/counter-pressure direction. The combustion trough 4 lies circumferentially on machined surfaces of the ridges 10 with its lower region, and makes contact in the region of the hubs or hub support, whereby the machined surfaces of the ridges and the hub support lie in a single plane, and a turned groove with a height difference 14 is formed in the ridges as a result of the machining.

In other embodiments according to the invention, the combustion trough can also rest on the hub support and the ridges 10 only locally, instead of circumferentially.

The shaft of the piston is recessed in the pin direction and forms a box shape. The base body 2, and the component 3 soldered to it, together form a cooling channel 11 that can be filled with motor oil.

The base body 2 consists of forged AFP steel. The component 3 also consists of steel, but can also consist of a nickel-based material that is resistant to high temperatures.

The base body 2 and the component 3 are connected with one another by means of a radial solder seam 12 and an axial solder seam 13.

The central part of the combustion trough 4 forms part of the interior shape of the piston, with its surfaces that face downward.

The compression height of the piston is 0.43×D.

What is claimed is:

1. A cooling channel piston for a direct injection diesel engine, the piston having a piston head and comprising:

a first piston part comprising a piston base body forged from steel, a skirt, a pair of pin boss portions and a ring part;

a second piston part soldered to the first piston part and consisting of steel or a nickel-based material and having an axially outside surface and an inside surface, the outside surface conspiring a combustion bowl with a border area and a central region and at least a part of a piston crown, wherein the first and the second piston parts together form a cooling channel that can be filled with oil, wherein the second piston part includes a circumferential contact surface which is arranged parallel to the piston crown and opposite the combustion bowl so that the contact surface can engage in a mating groove arranged in a contact web of the first piston part for soldering the two parts to one another;

wherein the contact web runs from the skirt or from the ring part radially inwardly, and a circumferential surface of the web in a pressure/counter-pressure direction and in a pin direction lies in a same mechanical machined plane; and wherein a central region of the combustion bowl comprises a radial inside distance between the pin boss portions, and the central region of the combustion bowl is formed in an axial piston direction in such away that the central region is arranged closer to the piston crown than the border areas of the combustion bowl.

2. A cooling channel piston according to claim 1, wherein a compression height KH lies in a range of 0.35 to 0.6 *D, wherein height RH represents an axial distance between a center axis of piston pin bores and an upper edge of the piston head.

3. A cooling channel piston according to claim 1, wherein the piston base body consists of AFP steel.

4. A cooling channel piston according to claim 1, wherein shaft walls of the piston that contain the pin boss portions are recessed to a width of <0.8 × piston diameter in a pin direction.

5. Cooling channel piston according to claim 1, further comprising a rod connected with the piston, said rod having a top edge lying at a level of a lower region of the combustion trough.

6. Cooling channel piston according to claim 1, wherein the piston has a diameter of <100 mm.

* * * * *